United States Patent [19]

Barbe et al.

[11] Patent Number: 4,505,453
[45] Date of Patent: Mar. 19, 1985

[54] GATE VALVE

[75] Inventors: Pierre L. Barbe, Toul; Jean P. Depoisson, Pont-A-Mousson, both of France

[73] Assignee: Pont-A-Mousson S.A., Nancy, France

[21] Appl. No.: 304,769

[22] Filed: Sep. 23, 1981

[30] Foreign Application Priority Data

Oct. 13, 1980 [FR] France ................................ 80 21808

[51] Int. Cl.$^3$ ...................... F16K 3/314; F16K 3/316
[52] U.S. Cl. ...................................... 251/328; 251/326
[58] Field of Search ......................... 251/326, 327, 328

[56] References Cited

FOREIGN PATENT DOCUMENTS

| 111503 | 6/1964 | Czechoslovakia ................. 251/326 |
| 1245664 | 7/1967 | Fed. Rep. of Germany ...... 252/326 |
| 1922516 | 11/1969 | Fed. Rep. of Germany ...... 251/326 |
| 1600745 | 4/1970 | Fed. Rep. of Germany ...... 251/326 |
| 1218240 | 12/1959 | France . |
| 160643 | 6/1979 | Netherlands ........................ 251/326 |

Primary Examiner—Arnold Rosenthal
Attorney, Agent, or Firm—Sughrue, Mion, Zinn, Macpeak and Seas

[57] ABSTRACT

The gate valve comprises a body having a horizontal flow passageway, a vertical housing opening into the flow passageway and a closure member movable in the housing and passageway. The closure member has on each side a vertical U-shaped guiding bearing surface which projects from a sealing bead on the closure member and extends from the lower end of the closure member to a region located above the equatorial plane of the valve. This bearing surface permanently cooperates with a vertical bearing surface provided in the body between the flow passageway and a seat surface and having, when viewed along the flow axis a downwardly open C-shape.

9 Claims, 30 Drawing Figures

GATE VALVE

DESCRIPTION

The present invention relates to a gate valve of the type comprising, on one hand, a body which has a flow passageway having a horizontal axis and a housing having a vertical axis which radially opens into said passageway, said housing being extended by a seat surface which is in two parts which are symmetrical relative to two perpendicular planes containing the axis of the housing, one of the planes containing the flow axis and, on the other hand, a closure member provided with a sealing bead and guided in vertical translation in the housing and in the flow passageway.

In the present description, it will be assumed for convenience that the flow axis is horizontal and the housing axis is vertical. However, it will be understood that these two axes may have any orientation in use of the gate valve.

The invention is applicable in particular to gate valves of the type described in French patent application Ser. No. 80 12 849, i.e. the type in which the sealing surfaces on the body and on the closure member or gate cross in the equatorial region of the axis of the flow cavity and have a mean seal line which has, when viewed in a direction perpendicular to the axis of the flow passageway, a generally X shape, the seal line being embodied on the closure member by the crest of a sealing bead carried by the closure member. In these gate valves, the uninterrupted sealing bead of the closure member forms two loops which are symmetrical relative to two planes of symmetry common to the closure member and the body of the valve, the upper part of the closure member having the general shape of a wedge and the lower part the shape of a plate for closing the flow cavity. The seal line has, when viewed in projection in the plane of symmetry containing the flow axis, an X shape, the upper part of the X having a U or V shape and its lower part a general shape of an inverted U or an ogival shape whose apex is located in the vicinity of the flow axis.

In the gate valve disclosed in the aforementioned patent application, the closure member is guided in its displacement in translation inside the body by complementary rectilinear sliding grooves and ribs which are parallel to the axis of translation of the closure member in the housing and are provided, on one hand, inside the housing and, on the other hand, on the periphery of the closure member in the vicinity of the upper part thereof. Apart from the fact that these guiding means consume space, they are insufficient to prevent any deformation of the closure member in the closing position in the case where the flow passageway contains a fluid under high pressure which subjects the closure member to high bending stresses in the unguided lower part thereof.

Indeed, this gate valve may have a direct passage for the fluid, the sealing surface of the body coinciding with the flow cavity in the lower part, or the flow passageway may include opposite the region in which the housing opens into the flow cavity, i.e. opposite the upper surface of the seat, a recess for housing the lower part of the closure member in the closing position, this recess being wider than the closure member and consequently providing no support for the latter. In either case, the closure member is guided and is in bearing relation to the body in the closing position only in its upper part in the region where the housing opens into the flow cavity.

The same insufficiency exists in the guiding means of the gate valve disclosed in French Pat. No. 1,218,240 although these means are less space consuming: on each side of the closure member there is provided within the perimeter of the sealing bead, a vertical rectilinear guiding rib cooperating with a vertical guiding groove of the body which exists only in the upper part of the seat in the vertical plane of symmetry containing the flow axis.

An object of the invention is to provide a gate valve comprising guiding means for the closure member which are an improvement over the guiding means of known gate valves.

For this purpose, the invention provides a gate valve of the aforementioned type, wherein the closure member comprises, on at least one side inside the sealing bead thereof, a guiding bearing surface having vertical generatrices having the general shape of an upwardly open U which extends from the lower end thereof to a region located above the equatorial plane thereof and which projects at each level relative to the sealing bead, the body including, between the flow cavity and the seat surface on the corresponding side of the housing, a complementary guiding surface which has vertical generatrices and extends from the upper part of the seat surface to a region located below the equatorial plane and has, when viewed along the flow axis, a downwardly open C shape.

Owing to these guiding bearing surfaces, the closure member is maintained and guided when it is in the closing position, on each side of the equatorial plane containing the flow axis where the resultant of the forces created by the pressure of the fluid on the upstream surface of the closure member is located. The good distribution of the guiding on each side of the resultant force considerably reduces the bending forces to which the closure member is subjected and effectively precludes any tilting of the closure member, even when the pressure prevailing in the flow cavity is high.

Further, when the closure member is raised or opened, the closure member is continuously guided up to the substantially fully open position on each side of a plane parallel to the equatorial plane and containing the resultant of the forces created by the hydrodynamic effect of the fluid on the part of the closure member located in the flow passageway. A little before its complete withdrawal from the flow cavity, the closure member is still guided by the lower curved part of the guiding bearing surface thereof.

Further, owing to the fact that the guiding surfaces are within the perimeter of the sealing surfaces both on the seat and on the closure member, the overall size of the closure member is reduced with respect to the overall sizes of the outer guiding ears, and the inner section of the housing in which the closure member moves may also be reduced.

The invention will be described hereinafter in more detail with reference to the accompanying drawings which represent only a few embodiments.

In the embodiment shown in FIGS. 1 to 12, the invention is applied to a gate valve of the type described in the aforementioned French patent application Ser. No. 80 12 849 of the Applicant. This gate valve comprises a T-shaped tubular body 1 which is moulded from ferrous or other material. The body 1 has a straight passageway or pipe 2 having an axis X—X for the inlet and outlet of the fluid passing through the valve and adapted to be interposed between and connected to two parts of a pipe in a sealed manner. The body 1 also includes a straight tubular housing 3 which has an axis Y—Y perpendicularly intersecting the axis X—X.

For convenience of description, it will be assumed that the axis X—X is horizontal, the axis Y—Y vertical and the housing 3 is disposed above the passageway 2. The reference letter P will designate the transverse plane of symmetry of the body, which is the plane containing the axis Y—Y of translation of the closure member and perpendicular to the flow axis X—X, the reference letter Q will designate the plane of symmetry or meridian plane formed by the axis X—X and Y—Y, and the reference letter R will represent the equatorial plane, i.e. the horizontal plane containing the flow axis X—X and perpendicular to the axis Y—Y of displacement of the closure member.

The upper part (not shown) of the housing 3 comprises in the known manner a cap closing the body 1. This cap includes means for guiding the rod for shifting the closure member and sealing means between the cap and the rod.

The flow passageway 2 has an inner flow cavity 4 which has an axis X—X and a circular cylindrical shape in the presently-described embodiment, although it may have a different shape.

The housing 3 has an inner cavity 5 which has an axis Y—Y and a substantially elliptical constant section. The cavity 5 opens radially into the cavity 4 where it is extended by a seat surface 6 of special shape described in the aforementioned French patent application Ser. No. 80 12 849. This seat surface, which has the meridian plane Q and transverse plane P as planes of symmetry and whose mean line defines the seal line of the body, is contained above the equatorial plane R in two convergent planes which have a rectilinear trace and intersect in the vicinity of the flow axis X—X. Below this equatorial plane, the seat surface is formed by evolutive helicoidal curved surfaces which have in side elevation an ogival shape or an inverted U shape the apex of which is in the vicinity of the flow axis and which merge with the wall of the flow cavity in the lower part of the latter opposed to the region in which the housing 3 opens into the flow cavity.

Adapted to be applied against the seat 6—6 is a closure member or gate 7 which is movable in vertical translation along the axis Y—Y and is shifted by an operating rod 8 which has an axis Y—Y and cooperates with an operating nut (not shown) which is trapped in a cage 9 provided in the upper part of the closure member 7. In the same way as the body 1, the closure member 7 has the planes P and Q as planes of symmetry.

The closure member 7 may be made from any suitable material such as grey cast iron, spheroidal graphite cast iron, steel, a copper alloy, or a plastics material, and may be manufactured by any suitable method (such as precision moulding, stamping, machining, etc.). In the presently-described embodiment, the closure member 7 is entirely covered with rubber.

The closure member has the general shape of a plate 10 perpendicular to the axis X—X and adapted to the dimensions of the flow cavity 4 and to the shapes of the seat 6. The lower part of this plate 10 is semi-cylindrical and the plate is surmounted by a wedge 11 whose apex edge is horizontal and perpendicularly meets the axis X—X.

The seal line is, in accordance with the aforementioned patent application Ser. No. 80 12 849, identical on the body and on the closure member and forms a double loop which crosses at two diametrally opposed points located in the region of the equatorial plane, i.e. of the flow axis. These two crossing loops are located above the equatorial plane R in two convergent planes and are projected onto the meridian plane Q in accordance with a wedge whose apex is in the vicinity of the flow axis. Below the equatorial plane, the two loops are projected onto the meridian plane Q in accordance with an ogival shape or an inverted U shape whose apex is located in the vicinity of the flow axis and coincide in their lower part with the wall of the flow cavity. On the closure member 7, the seal line is embodied by the crest 12 of a sealing bead which has a triangular cross-sectional shape and constitutes a projection on the rubber cover of the closure member.

In its upper part, the sealing surface of the seat 6 is transversely oriented relative to the flow axis X—X. In starting at the equatorial plane, this sealing surface undergoes a gradual evolution in the downward direction by a helicoidal twisting thereof until it merges with the flow cavity. The orientation of the bead of the closure member has an evolution which corresponds to that of the crest 12, i.e. always faces the seat.

The two seal lines of the seat 6 and the closure member are theoretically identical and coincide in the closing position of the gate valve. However, in practice, bearing in mind manufacturing tolerances, this condition is only imperfectly satisfied. Consequently, in order to take into account manufacturing tolerances but nonetheless ensure the seal, it is advantageous to arrange that the seat surface 6 have in the equatorial region, on each side of the flow axis, two flat or truncated surfaces 14 while the bead 13 of the closure member 7 has short equatorial straight connecting sections 15 which are vertical in lateral projection (FIG. 1) and are adapted to be applied against the flat or truncated surfaces 14.

The whole of this gate valve has been described in detail in the aforementioned French patent application Ser. No. 80 12 849. The gate valve of the present invention differs therefrom by the means for guiding the closure member 7. These means will now be described.

Figure 5:
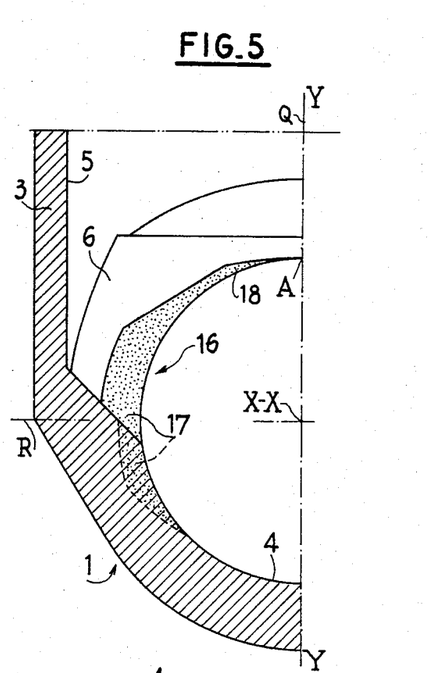
FIGS. 5A, 5B and 5C are half cross-sectional views, taken on line 5—5 of FIG. 4, which show the various guiding surfaces (partly hidden) of the body of the gate valve in a shaded region.
Figure 6:
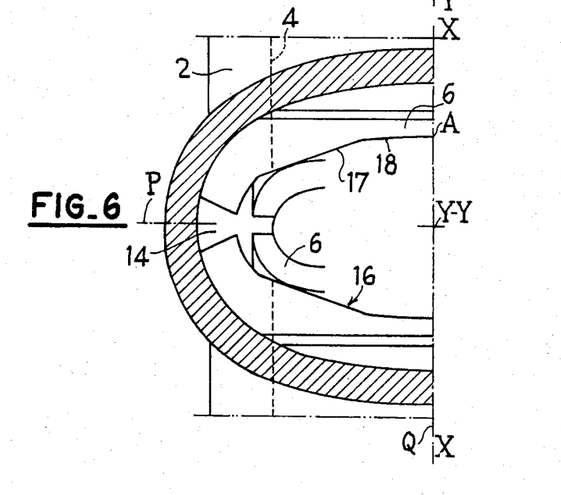
FIGS. 6, 6A, 6B and 6C are half top plan views of the body of FIG. 5A, 5B and 5C, respectively.
Figures 7, 8:
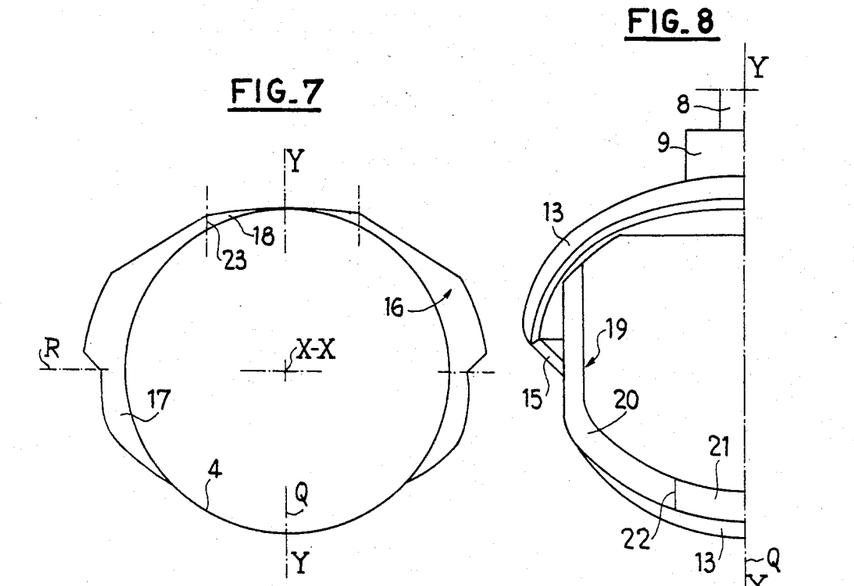
FIG. 7 is a view of the guiding surface of the body of the gate valve, this view being taken in the transverse plane of symmetry of the valve.
FIG. 8 is a half view of the closure member alone, in the same plane as FIG. 7.
Figure 9:
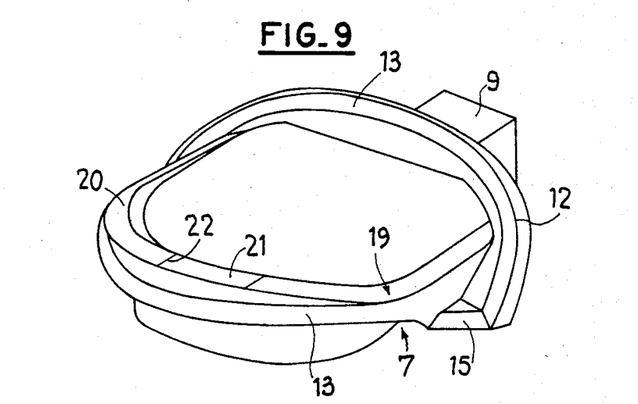
FIG. 9 is a diagrammatic perspective view of one half of the closure member located on the same side of the transverse plane of symmetry of the gate valve.
Figure 10:
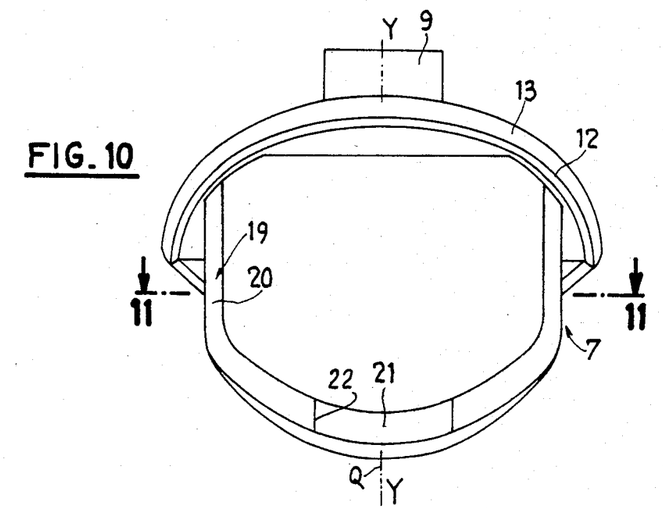
FIG. 10 is a view of the closure member alone, in the same plane as FIG. 2.

(a) Provided on the body (FIGS. 4,5,6 and 7) are two guiding surfaces 16, namely one surface for each side of the closure member 7 and therefore on each side of the transverse plane P (FIGS. 4 and 6), the surfaces being symmetrical relative to the meridian plane Q (FIGS. 5,6 and 7).

The guiding surfaces 6 have vertical generatrices. They are disposed between the flow cavity 4 and the sealing surface or seat surface 6. In front of the transverse plane P, they have the general shape of an inverted U or C which is downwardly open and caps the flow cavity 4 in the upper part thereof where the housing 3 opens into this flow cavity (FIGS. 5 and 7).

In the embodiments shown in FIGS. 4 to 7, each guiding surface 16 has (FIG. 6) a pair of lateral planar portions 17 which are oblique relative to the transverse plane P and tangent to the horizontal projection of the lower part of the seat 6 (FIG. 6), and, between these two planar portions 17 above the flow cavity 4, a cylindrical portion 18 having a curved directrix which extends roughly from the point A where the apex of the seat surface 6 meets the flow cavity 4.

In front of the transverse plane P (FIGS. 5 and 7), the planar portions 17 of the guiding surface 16 have a maximum width in the region of the equatorial plane R and they narrow in the direction toward the housing 3 down to substantially zero width in the plane Q. By way of modification, the vertical dimension of the central curve portion 18 may be upwardly widened. This form gives the surface 16 in FIGS. 5 and 7 the shape of a winged bonnet placed on a human head, which latter is represented by the flow cavity 4.

Figure 5A:
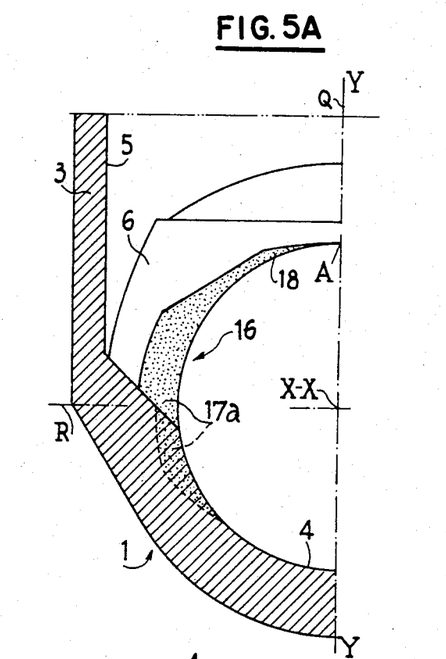
Figure 5B:
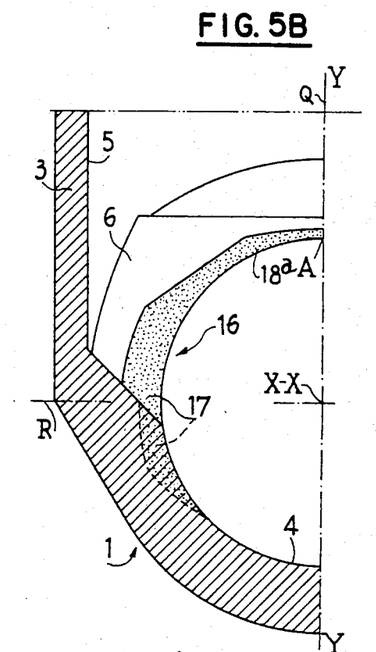
Figure 5C:
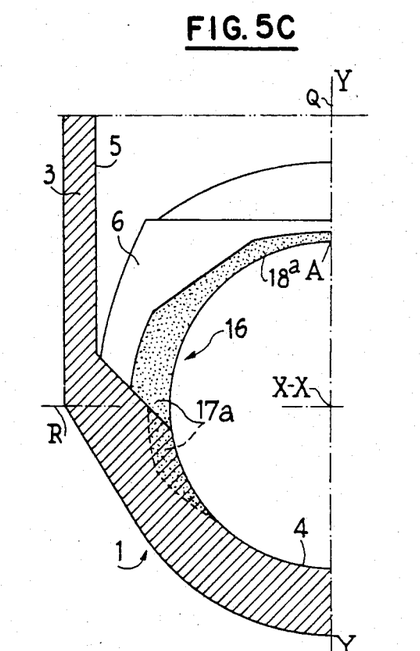
Figure 6A:
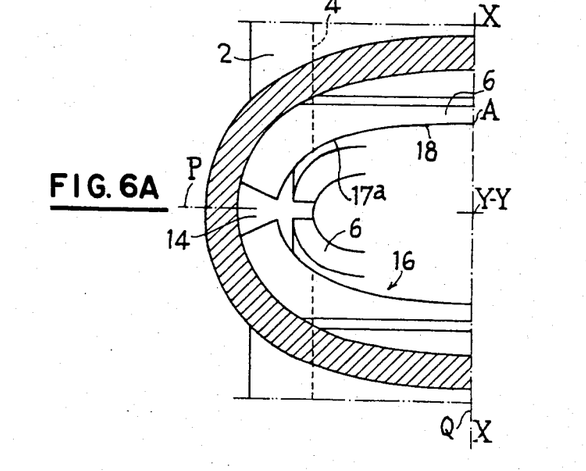
Figure 6B:
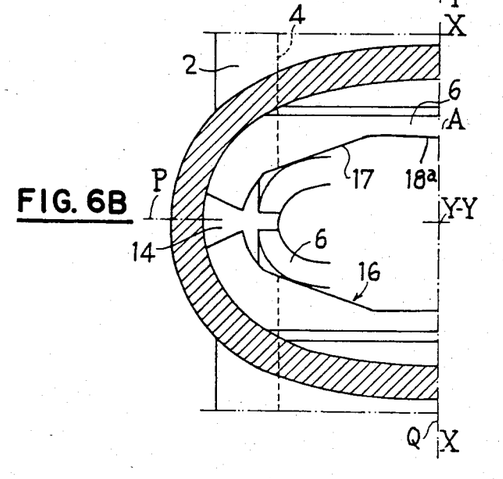
Figure 6C:
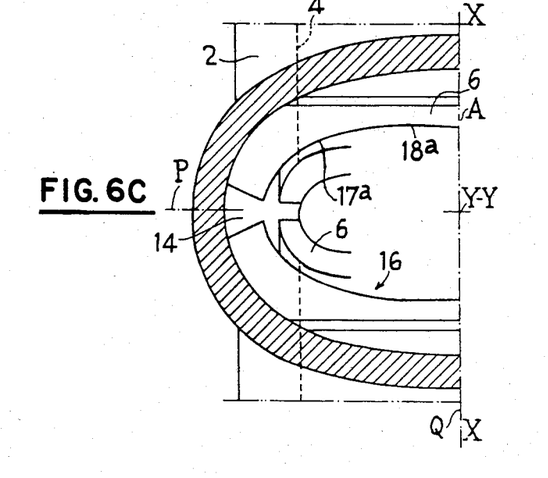

In other embodiments, the planar portions 17 are replaced by curved portions 17a which are inscribed in the projection on the equatorial plane R of the intersection of the upper part of the seat surface 6 with the flow cavity 4 and extend the surfaces 18, the whole of the horizontal projection of the surface 16 then having a roughly elliptical shape as shown in FIGS. 5A and 6A. By way of another modification, as shown in FIGS. 5B and 6B, the curved portion 18 may be replaced by a planar portion 18a perpendicular to the axis X—X, in which case the surface 16 is projected onto the plane R as a broken line. Again, the two aforementioned modifications may be combined (curved lateral portions and planar central portion) as shown in FIGS. 5C and 6C.

On each side of the transverse plane P, the guiding surface 16 is thus formed by the intersection of the region of the body 1 located between the flow cavity 4 and the seat 6 with a cylinder having vertical generatrices the directrix curve of which is one of the curves 17-18-17, 17a-18a-17a, 17-18a-17 and 17a-18a-17a.

(b) As concerns the closure member 7 (FIGS. 1 to 3 and 8 to 12):

On each side of the plate 10, and consequently symmetrically relative to the transverse plane P and axially projecting at each point from the corresponding point of the sealing bead (FIG. 1) and within the perimeter of the sealing bead when viewed in the transverse plane P (FIG. 2), the closure member 7 comprises a guiding strip or band 19 which has vertical generatrices and has the shape of a U whose lower loop passes in the vicinity of the lower generatrices of the flow cavity 4 opposite the housing 3. Each guiding strip 19 has the meridian plane Q as plane of symmetry and includes two planar and vertical surface portions 20 constituting the branches of the U and a portion of its loop and extending from a region located below the equatorial plane R up to the upper part of the sealing bead 13 in the vicinity of the intersection of the plate 10 and the upper wedge 11 of the closure member 7.

Figures 1, 2, 3:
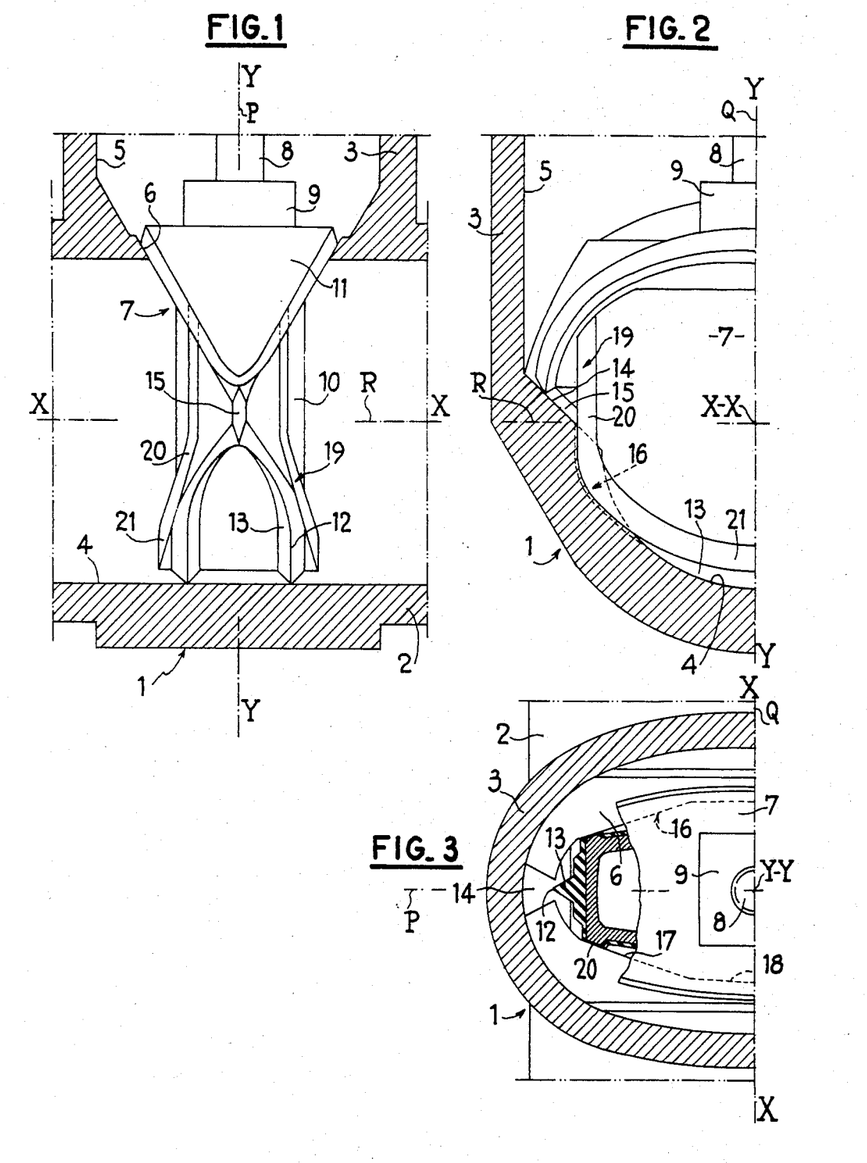
FIG. 1 is a partial side elevational view, partly in longitudinal section, of a gate valve according to the invention in which the closure member thereof is in the closing position, the plane of the section being the plane of symmetry containing the flow axis and the axis of translation of the closure member, neither the upper part of the valve nor the ends of the flow passageway being shown.
FIG. 2 is a half cross-sectional view, taken on line 2—2 of FIG. 1, i.e. in the transverse plane of symmetry of the gate valve containing the axis of translation of the closure member and perpendicular to the flow axis.
FIG. 3 is a half plan view of the valve of FIG. 2, with a part of the closure member cut away for the purpose of illustrating the cooperation of the guiding surfaces of the seat and closure member.
Figure 4:
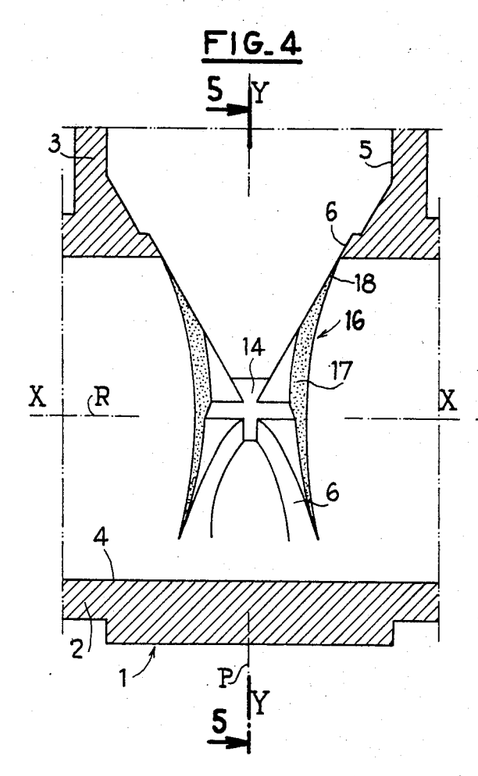
FIG. 4 is a partial sectional view similar to FIG. 1 of the body alone, showing the guiding surface of this body shaded.

The planar vertical portions 20 are oblique relative to the transverse plane P (FIG. 3).

The two planar portions 20 are connected at the bottom by a non-planar portion 21 which has vertical generatrices and is part of the loop of the U. The mean plane S of this loop (FIG. 1) is inclined to the vertical and extends downwardly away from the plane P. Thus, below the plane R, this loop is the surface the most remote from the plane P, this surface becoming a projecting surface relative to the plate of the closure member so as to cooperate with the curved upper portion 18 of the guiding bearing surface 16 of the body in the upper part of the flow cavity 4, as will be explained hereinafter.

As can be seen in FIG. 8, the planar surfaces 20 of the band 19 extend to an extreme vertical generatrix 22 which is located, when viewed along the flow axis, at about one-third of one-half of the width of the plate 10 from the plane P. The distance between the plane P and the vertical generatrix 23 between the lateral portion 17 and central portion 18 of the fixed guiding surface 16 is the same (FIG. 7).

Figure 11:
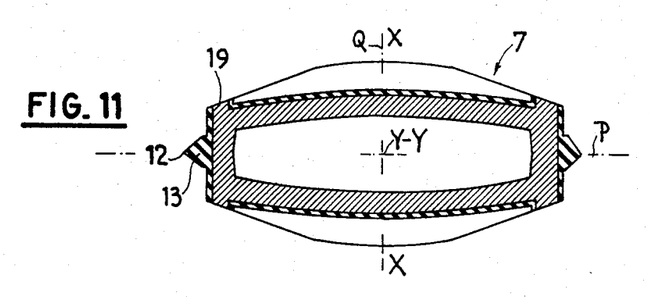
FIGS. 11 and 12 are sectional views, taken on the horizontal line II—II of FIG. 10, in respect of two modifications.
Figure 12:
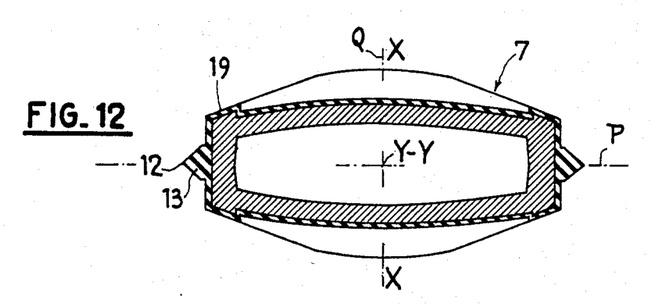
Figure 13:
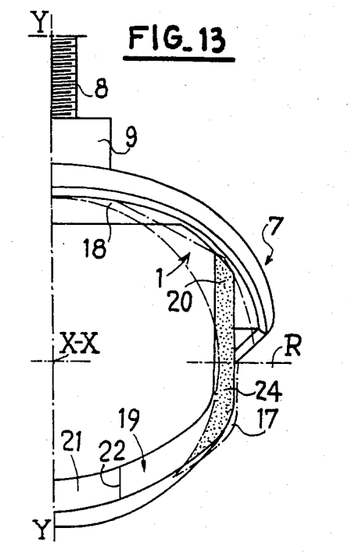
FIGS. 13 to 16 are views, in the same plane as FIG. 10, of the closure member alone, in different positions between closure and opening, with the profile of the guides of the body of the gate valve in dot-dash lines.
Figure 14:
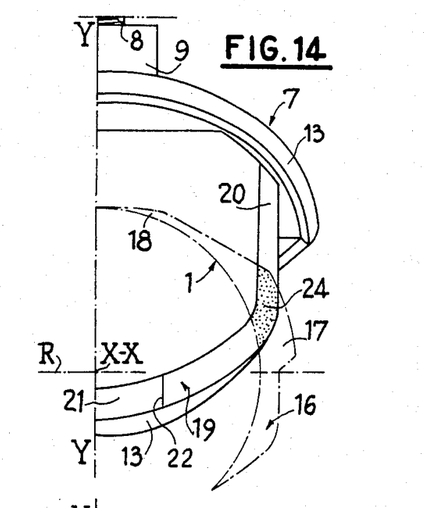
Figure 15:
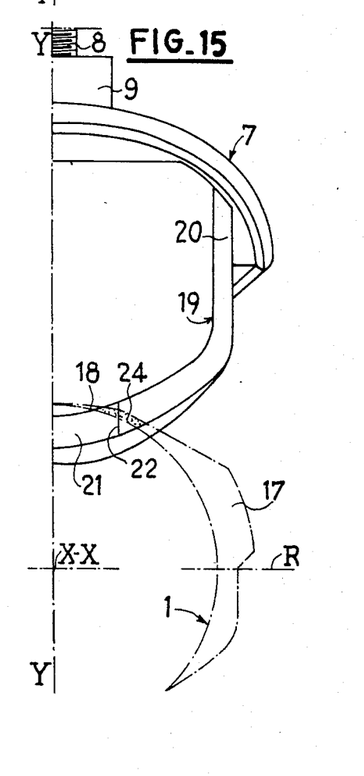
Figure 16:
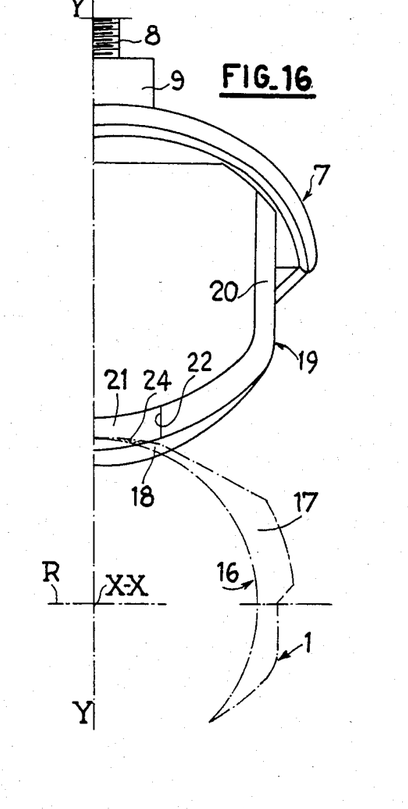
Figure 17:
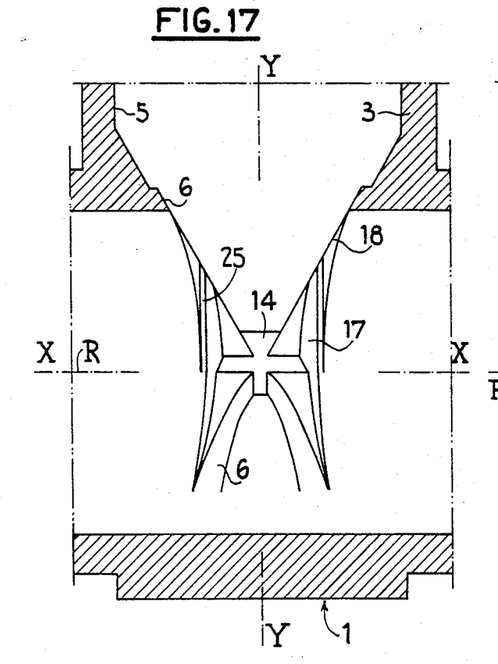
FIGS. 17 to 19 are views respectively similar to FIGS. 1 to 3 of a modification of the gate valve according to the invention.
Figure 18:
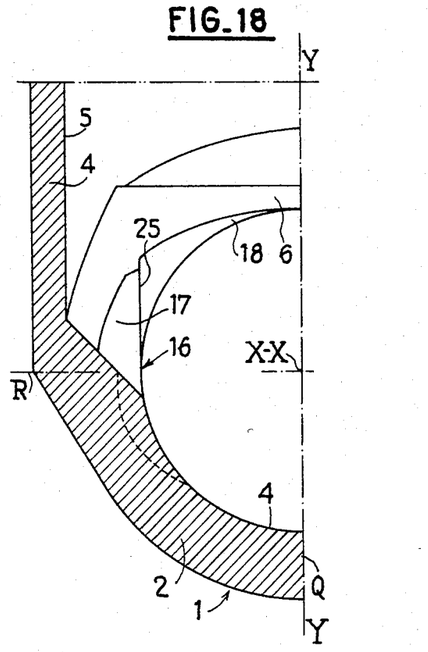
Figure 19:
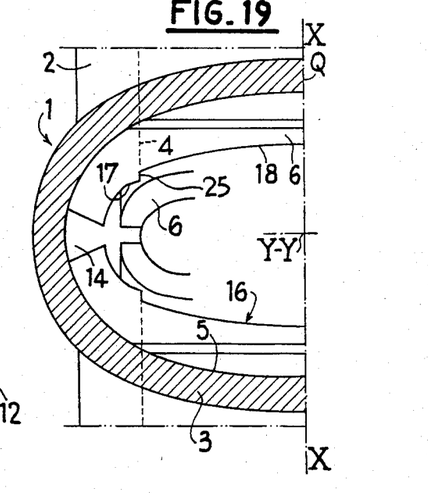
Figure 20:
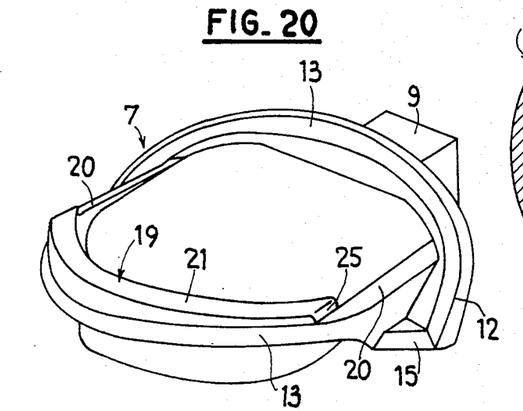
FIG. 20 is a view similar to FIG. 9 of the closure member of this modification.
Figure 21:
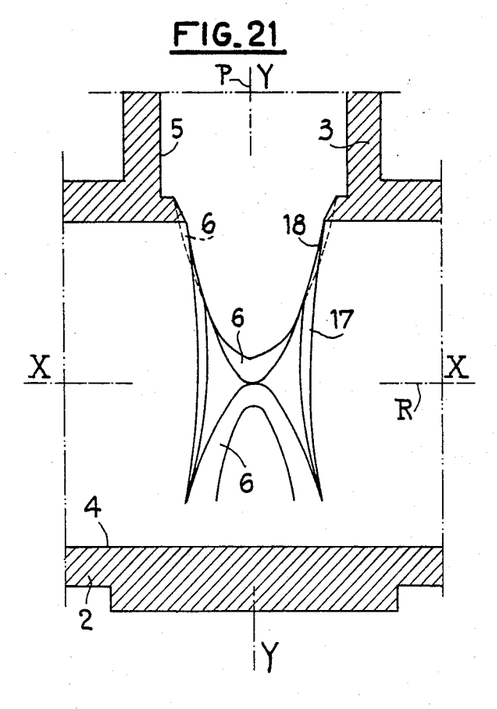
FIGS. 21 to 24 are views respectively similar to FIGS. 17 to 20 of another embodiment of the gate valve according to the invention.
Figure 22:
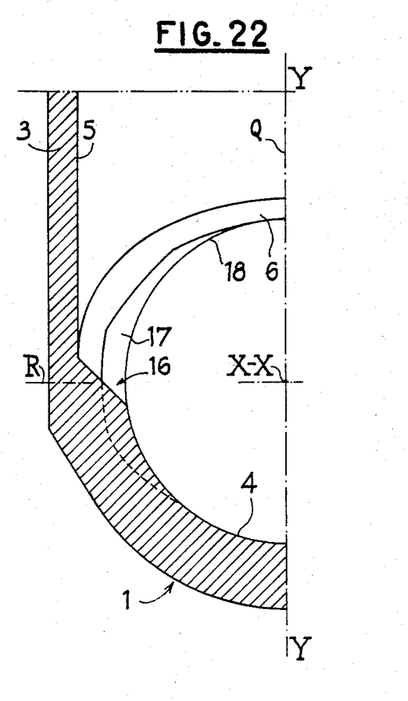
Figure 23:
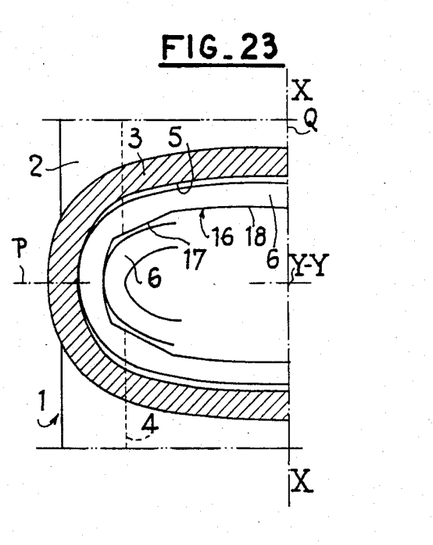
Figure 24:
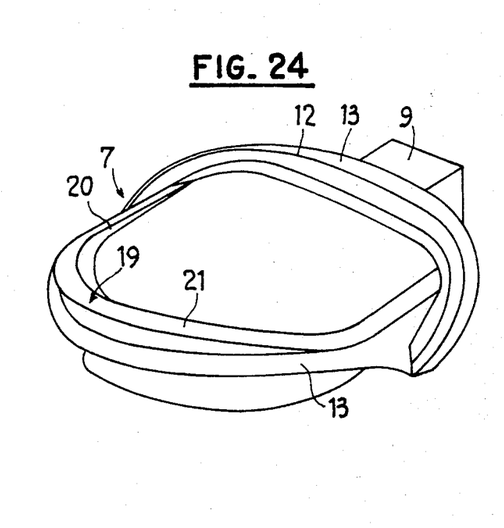

As shown in FIGS. 11 and 12, the guiding surfaces 19 of the closure member 7 may either be devoid of a rubber cover (FIG. 11) or be covered with rubber in the same way as the rest of the closure member (FIG. 12) so as to facilitate manufacture and improve the resistance to corrosive fluids passing through the valve.

The operation of the guiding means just described will be explained hereinafter with reference to FIGS. 13 to 16 in which the regions of contact are shaded.

(1) In the closed position (FIGS. 1,2,3 and 13), only the planar and vertical guiding bearing surfaces, namely 17 for the body and 20 for the closure member, are in contact. It can be seen that the region of contact 24 concerns a large part of the length and the entire width of the surfaces 20 of the closure member, but only a fraction of the total area of the surfaces 17 of the body. Consequently, the bearing contact is ensured irrespective of the manufacturing tolerances in a region starting below the equatorial plane R and extending substantially above this equatorial plane, this region being symmetrical relative to the plane Q and in the vicinity of the marginal regions of the closure member.

(2) In the course of opening (FIGS. 14 to 16), right from the start of the opening i.e. from the raising of the closure member 7, the sealing bead 13 of the closure member is no longer in contact with the seat surface 6. It moves relative to the seat without sliding owing to the aforementioned geometrical shapes of the sealing elements, as disclosed in the aforementioned French patent application Ser. No. 80 12 849. Only the guiding bearing surfaces 16 and 19 will therefore slide against each other.

The planar lateral portions 17 and 20 of the guiding bearing surfaces first continue to cooperate in the course of the upward displacement of the closure member 7 (FIG. 14), but the region of contact 24 gradually becomes reduced in height and rises toward the curved surface 18 of the body 1.

A moment of transition is then reached (FIG. 15) where the cooperation 17-20 is superimposed on the cooperation of the curved region 18 of the body with the curved region 21 of the closure member. This ensures the absence of discontinuity of the guiding of the closure member when the region of contact 24 between the closure member and the body passes from the planar regions 17-20 to the curved regions 18-21.

Then, when the major part of the section of passage of the flow cavity 4 is already opened up by the closure member 7, the latter reaches a position (FIG. 16) in which the curved guiding portion 21 of the closure member is in contact with the curved guiding portion 18 of the body. This guiding contact, even on a small surface 24, is advantageously maintained until the complete opening of the closure member 7.

(3) In the course of the descent of the closure member to the closing position, the guiding is achieved in the same way but in the opposite direction, namely first between the curved portions 18 and 21, then simultaneously between these curved portions and the planar portions 17 and 20, then solely between the planar portions 17 and 20 of the guiding bearing surfaces 16 and 19.

The guiding means 16 and 19, which have a very small overall size thus effectively resist, in all the positions of the closure member, the forces which tend to bend or tilt the closure member under the static or dynamic effect of the fluid passing through the valve.

Further, both in the course of the opening and in the course of the closing of the closure member 7, as the guiding bearing surfaces 16 and 19 of the invention are located symmetrically on each side of the planes of symmetry P and Q, they neutralize the parasitic rotational torque which has a tendency to be applied to the closure member by the actuation of the screwthreaded operating rod 8 when the latter is driven in rotation for raising or lowering the closure member.

Modifications

The continuity of the guiding of the closure member does not necessarily imply continuity of the guiding surfaces. Thus, instead of arranging that the guiding bearing surfaces 16 and 19 of the body and closure member be continuous as before, they may be discontinuous, i.e. interrupted:

in respect of the bearing surface 16 of the body, in its upper part, between the curved portions 18 and the planar lateral portions 17;

in respect of the bearing surface 19 of the closure member, in its lower part, between the curved portion 21 and the lateral planar portions 20.

More precisely, instead of being exactly in the extension of each other, the curved portions 18 of the body and the curved portions 21 of the closure member may be offset relative to the respective planar portions 17 and 20 with a gradual connection or an interruption and a connecting step 25. The offsetting may be in a direction parallel to the axis X—X (FIGS. 17 to 20) or parallel to the equatorial plane R and perpendicular to the axis X—X.

Further, as shown in FIGS. 21 to 24, the invention is directly applicable to the case where the upper parts of the sealing surface 6 of the body is, when seen in side elevation, a warped U-shaped surface and not a planar V-shaped surface. The shape of the guiding surfaces 16 illustrated in FIGS. 21 to 24, is easily deduced from the manner in which the surfaces are obtained, which is the same as before. The shape of the upper part of the seat 6, which is connected without a flat surface to its lower part, is described in detail in the aforementioned French patent application Ser. No. 80 12 849.

The invention is generally applicable to all types of gate valves having a gate.

Having now described our invention what we claim as new and desire to secure by Letters Patent is:

1. A gate valve comprising in combination:
   a body (1) which has a flow passageway (2) having a tubular flow cavity (4) and a horizontal flow axis, and a housing which has a vertical axis and radially opens into said passageway, said flow passageway comprising a seat surface in two parts which are symmetrical relative to two perpendicular planes which contain the axis of the housing, one of which planes contains the flow axis,
   a closure member (7) provided with a sealing bead (13), having a perimeter, and guided in vertical translation in the housing and in the flow passageway,
   the closure member comprising, on at least one side within the perimeter of the sealing bead, a guiding bearing surface (19-20) for guiding the vertical movement of the closure member and which has vertical generatrices and the general shape of an upwardly open U which extends from the lower end thereof to a region located above the equatorial plane thereof and which is in projecting relation, at each level, to the sealing bead,
   the body comprising, between the flow passageway and the seat surface on the corresponding side of the body, a complementary guiding bearing surface (16-17-18) which is located on said flow cavity (4) for cooperation with said guiding bearing surface (19-20) of the closure member for guiding its vertical sliding movements during the opening and closure operations of the gate valve, and which has vertical generatrices and extends from the upper part of the seat surface to a region located below said equatorial plane and which has, when viewed along the flow axis, the shape of a downwardly open C.

2. A gate valve according to claim 1, wherein the bearing surfaces of the closure member and the body are continuous.

3. A gate valve according to claim 1, wherein the bearing surfaces of the closure member and the body are offset between lateral and central portions thereof.

4. A gate valve according to claim 1, 2 or 3, wherein, when viewed in plan, the bearing surface of the body has two straight lateral portions interconnected by a curved intermediate portion.

5. A gate valve according to claim 1, 2 or 3, wherein, when viewed in plan, the bearing surface of the body has two straight lateral portions interconnected by a straight intermediate portion which makes an angle with each of said lateral portions.

6. A gate valve according to claim 1, 2 or 3, wherein, when viewed in plan, the bearing surface of the body forms a continuous curve.

7. A gate valve according to claim 1, 2 or 3, comprising a rubber cover on the closure member, the bearing surface of the closure member being devoid of a cover.

8. A gate valve according to claim 1, 2 or 3, comprising a rubber cover on the closure member, and a rubber cover on the bearing surface of the closure member.

9. A gate valve according to claim 1, wherein the upper parts of the seat surface of the body, when seen in side elevation, are planar V-shaped surfaces.

* * * * *